(12) United States Patent
Binsztok

(10) Patent No.: US 11,308,233 B2
(45) Date of Patent: Apr. 19, 2022

(54) METHOD FOR INFORMATION RETRIEVAL IN AN ENCRYPTED CORPUS STORED ON A SERVER

(71) Applicant: WALLIX, Saint-Honoré (FR)

(72) Inventor: Henri Binsztok, Paris (FR)

(73) Assignee: WALLIX, Saint-Honoré (FR)

( * ) Notice: Subject to any disclaimer, the term of this patent is extended or adjusted under 35 U.S.C. 154(b) by 106 days.

(21) Appl. No.: 16/483,684

(22) PCT Filed: Feb. 5, 2018

(86) PCT No.: PCT/FR2018/050276
§ 371 (c)(1),
(2) Date: Aug. 5, 2019

(87) PCT Pub. No.: WO2018/150119
PCT Pub. Date: Aug. 23, 2018

(65) Prior Publication Data
US 2020/0019723 A1    Jan. 16, 2020

(30) Foreign Application Priority Data

Feb. 15, 2017 (FR) ........................................ 1751241

(51) Int. Cl.
*G06F 16/00* (2019.01)
*G06F 21/62* (2013.01)
(Continued)

(52) U.S. Cl.
CPC ........ *G06F 21/6227* (2013.01); *G06F 16/334* (2019.01); *G06F 16/951* (2019.01);
(Continued)

(58) Field of Classification Search
None
See application file for complete search history.

(56) References Cited

U.S. PATENT DOCUMENTS 8,677,499 B2 * 3/2014 Lim ........................ H04L 63/10
726/26
8,904,171 B2 * 12/2014 Clifton .................. G06F 16/334
713/167
(Continued)

FOREIGN PATENT DOCUMENTS

EP    2865127        4/2015
EP    3076329 B1    6/2019

OTHER PUBLICATIONS

Encrypted phrase searching in the cloud, Zittrower et al., IEEE (Year: 2012).*
(Continued)

*Primary Examiner* — Jean M Corrielus
(74) *Attorney, Agent, or Firm* — TraskBritt

(57) ABSTRACT

A method for information retrieval in an encrypted corpus stored on a server, from a digital request calculated on a customer device, containing a sequence of terms, includes the following steps: encryption of the request on a customer computer device and transmission of same to a database management server; and homomorphic calculation, on the server, of the encrypted response to the encrypted request recorded on the server. The method further comprises an additional requesting step performed on the customer device; and presentation of the result in an ordered form of the documents, in application of the processing of the previous step. The present disclosure also relates to a method for preparing a requestable base and to a method for information retrieval in an encrypted corpus.

5 Claims, 2 Drawing Sheets

(51) Int. Cl.
  *G06F 16/33*    (2019.01)
  *G06F 16/951*   (2019.01)
  *H04L 9/00*     (2022.01)

(52) U.S. Cl.
  CPC .......... *H04L 9/008* (2013.01); *G06F 2216/11* (2013.01); *G06F 2221/2107* (2013.01)

(56) References Cited

U.S. PATENT DOCUMENTS

| | | | |
|---|---|---|---|
| 8,966,250 B2* | 2/2015 | Shochet | H04L 9/0662 713/165 |
| 9,152,774 B2* | 10/2015 | Lim | H04L 63/20 |
| 9,396,351 B2* | 7/2016 | Lim | G06F 9/468 |
| 9,531,595 B2* | 12/2016 | Lim | G06F 21/6227 |
| 9,722,777 B2* | 8/2017 | Payton | H04L 9/008 |
| 9,912,472 B2* | 3/2018 | Payton | H04L 9/008 |
| 10,153,895 B2* | 12/2018 | Payton | H04L 9/14 |
| 2010/0146299 A1 | 6/2010 | Swaminathan et al. | |
| 2013/0067225 A1* | 3/2013 | Shochet | G06F 21/6209 713/165 |
| 2015/0039912 A1* | 2/2015 | Payton | H04L 9/008 713/193 |
| 2015/0236849 A1* | 8/2015 | Ayday | G16B 50/00 713/193 |
| 2015/0356314 A1* | 12/2015 | Kumar | G06F 16/2228 713/165 |
| 2016/0224735 A1* | 8/2016 | Ayday | G16B 50/30 |
| 2017/0288856 A1* | 10/2017 | Payton | H04L 9/008 |
| 2017/0293913 A1* | 10/2017 | Gulak | G16H 10/60 |
| 2018/0131507 A1* | 5/2018 | Payton | H04L 9/14 |
| 2019/0149317 A1* | 5/2019 | Payton | H04L 9/008 713/193 |
| 2020/0076578 A1* | 3/2020 | Ithal | G06F 16/2255 |

OTHER PUBLICATIONS

Design and implementation of multi-user secure indices for encrypted cloud storage, Lin et al., (Year: 2013).*
Baldimtsi et al., Sorting and Searching Behind the Curtain: Private Outsourced Sort and Frequency-Based Ranking of Search Results Over Encrypted Data, Int.
Curtmola et al., Searchable Symmetric Encryption: Improved Definitions and Efficient Constructions, International Association for Cryptologic Research, vol. 20110420:005403, (Apr. 20, 2011), 33 pages.
International Search Report for International Application No. PCT/FR2018/050276 dated Apr. 6, 2018, 3 pages.
International Written Opinion for International Application No. PCT/FR2018/050276 dated Apr. 6, 2018, 8 pages.
MC Brearty et al., Preserving Data Privacy with Searchable Symmetric Encryption, 2016 27th Irish Signals and Systems Conference (ISSC), IEEE, (Jun. 21, 2016), 7 pages.
Shen et al., A Similarity Evaluation Algorithm and its Application in Multi-Keyword Search on Encrypted Cloud Data, IEEE Military Communications Conference, IEEE, (Oct. 26, 3015), pp. 1218-1223.
Strizhov et al., Multi-Keyword Similarity Search Over Encrypted Cloud Data, 29th IFIP International Information Security Conference (SEC), (Jun. 2014), pp. 52-65.
Gentry, A Fully Homomorphic Encryption Scheme: A Dissertation Submitted to the Department of Computer Science and the Committee on Graduate Studies of Stanford University, Chapter 7, Sep. 2009, 209 pages.
Zhou et al., Efficient homomorphic encryption on integer vectors and its applications, Information Theory and Applications Workshop (ITA), IEEE., Feb. 2014, pp. 1-9.

* cited by examiner

METHOD FOR INFORMATION RETRIEVAL IN AN ENCRYPTED CORPUS STORED ON A SERVER

CROSS-REFERENCE TO RELATED APPLICATIONS

This application is a national phase entry under 35 U.S.C. § 371 of International Patent Application PCT/FR2018/050276, filed Feb. 5, 2018, designating the United States of America and published as International Patent Publication WO 2018/150119 A1 on Aug. 23, 2018, which claims the benefit under Article 8 of the Patent Cooperation Treaty to French Patent Application Serial No. 1751241, filed Feb. 15, 2017.

TECHNICAL FIELD

The field of the present disclosure relates to information retrieval from a database in a form that preserves the confidentiality of data and requests.

The present disclosure relates, in particular, to the systems for processing personal data, and, in particular, health data.

BACKGROUND

Databases are an integral part of many applications, such as financial applications and medical e-health applications. Databases can be very sensitive, containing valuable data belonging to a company or individuals. The theft of sensitive data is a growing concern for individuals, companies and governments.

Databases can be made up of collections of raw files or managed using the database management system (DBMS), such as the Oracle database, MySQL, Microsoft SQL Server, etc. A database can be deployed on a server within an organization, on a virtual server in a cloud, or on a DBMS service in a cloud. Data theft is a concern for every type of deployment.

When databases are deployed on a server in a company's premises, the server is physically under the company's control. If the server is compromised or infected by malware or viruses, hackers may be able to access the raw database data file and steal data by bypassing any company access control mechanism. On the other hand, corporate database administrators have the potential to violate privacy and data integrity intentionally or accidentally, as they can access stored data to perform database management tasks. A database system can also be deployed by a company on a virtual server that runs on a cloud such as Amazon Elastic Compute Cloud (Amazon EC2). In this case, the virtual server underlying the database is physically under the control of the cloud provider, and on the company's virtual server installs DBMS to manage their databases. As in the above case, data theft also occurs in this case, if the cloud infrastructure is compromised by attackers, infected with malware or viruses, and the company's database administrators could violate database confidentiality and integrity.

In addition, if not all cloud providers are trustworthy; they can steal database data from the virtual servers provided by them.

To address these risks, solutions using Homomorphic Encryption (HE) methods for database querying have recently been considered.

Homomorphic encryption methods have been developed for search engine applications, in particular, the user sends an encrypted request to the search engine, without the latter being aware of the request received. It applies a classic search operation to find matching documents and returns the response to the user in an encrypted form. Thus, the search engine never knows the clear content of the request.

These homomorphic encryption methods also make it possible to search among encrypted files on a remote server to retrieve files that contain a term transmitted as an encrypted request to a remote server. The server applies the search without knowing the clear terms of the query and returns the result. The server never knows the requests or documents recorded in the database other than in an encrypted form. An attack on the server therefore does not create any risk with regard to the confidentiality of information, for example, personal data or health data.

Another application relates to biometrics using a database of fingerprints of persons authorized to perform an action, for example, entering a protected building. These fingerprints are naturally encrypted, because they are personal data that cannot be revoked.

Users scan their fingerprints and these are compared with those in the database. Two fingerprints of the same person taken at two different times are never strictly identical and it is therefore not possible to make a simple comparison of the encrypted fingerprints (two encrypted ones of two different fingerprints are obviously different). Thanks to homomorphic encryption, it is possible to compare encrypted fingerprints without ever decrypting them.

STATE OF THE ART

It is known in the state of the art a document that presented the basics of homomorphic encryption that is the thesis "A FULLY HOMOMORPHIC ENCRYPTION SCHEME: A DISSERTATION SUBMITTED TO THE DEPARTMENT OF COMPUTER SCIENCE AND THE COMMITTEE ON GRADUATE STUDIES OF STANFORD UNIVERSITY" in September 2009, which describes in Chapter 7 the basic principles of the application to information retrieval.

It is also known that the article "Multi-keyword Similarity Search over Encrypted Cloud Data"; Mikhail Strizhov 1 Indrajit Ray 1 29th IFIP International Information Security Conference (SEC), June 2014, Marrakech, Morocco. Springer, IFIP. This article describes a solution based on homomorphic encryption for searching for encrypted documents on a server without requiring the documents to be decrypted before searching.

Also known is the U.S. Pat. No. 8,904,171 describing a secure search and information retrieval process that includes receiving an encrypted request, creating a swapped search tree with nodes that have been swapped and encrypted.

The search tree is encrypted with a first private encryption key. The server receives a request from a customer that includes a set of keywords, and each request term is encrypted with the first private encryption key. The search is performed using a request and evaluation at each node of the tree to determine if one or more match(es) exist(s). The response is based on the match of keywords for each document and one or more encrypted node(s) with the first private encryption key.

It is also known that the European patent E2865127 describing a homomorphic encryption for database query. Numerical values are encrypted using keys and random numbers to produce encrypted text. The encrypted text is homomorphic and consists of two or more encrypted subtexts. Queries using addition, averaging and multiplication operations can be performed without deciphering the numerical values applicable to the query. Each encrypted subtext is stored in a single record and in separate attributes. The present disclosure relates to methods for the encryption and decryption, the creation of an appropriate table, the interrogation of such a database and the updating of such a database.

In addition, US documents 2010/146299 are known.

Drawbacks of the Prior Art

One of the disadvantages of homomorphic encryption is that the size of the keys and the cost (in computing time) of the operations are much larger than traditional encryption processes.

Prior art solutions have a major disadvantage resulting from the computing power required to execute, on the server, the homomorphic encryption processing each time a new document is indexed and each time a new request is made. For this reason, prior art solutions are only applicable to very limited corpora, for example, a company directory or a small set of textual documents.

Moreover, prior art solutions are limited to searching for documents on the basis of a binary criterion of presence or absence in the document of a term of the request, without allowing to propose in an efficient way a ranking of the relevance of the documents corresponding to the request; the method according to the present disclosure proposes an efficient solution to information retrieval in a large encrypted corpus.

BRIEF SUMMARY

In order to address these disadvantages, the present disclosure relates to a first aspect of a method for information retrieval in an encrypted corpus stored on a server, from a digital request calculated on a customer device, containing a sequence of terms, comprising the following steps:
  Encryption of the request on a customer computer device;
  Transmission of the encrypted request to a database management server;
  Homomorphic calculation on the server of the encrypted response to the encrypted request recorded on the server;
  Transmission of the encrypted response to the customer device;
  Decryption of the encrypted response 50 on the customer device and extraction of the document identifiers characterized in that it comprises:
    a) calculation steps on the customer device, when introducing a new requestable document i, for each document i belonging to the corpus, a first table (a term frequency (TF) table corresponding to the document i) $TF_i$ and a second table La document frequency (df) table corresponding to the document i) $\Delta df_i$
      the first table $TF_i$ comprising, for each indexed term (or a word w) of the document i, the number of occurrences of the term w in the document i, and
      the second table $\Delta df_i$ constituted by the index of the words w present in the document i;
    b) the encryption of document i and the table $\Delta df_i$, as well as the encryption by a homomorphic encryption method of the table TFi, and the transmission of these three encrypted digital information to the server for recording in a storage space dedicated to a user A or a group $\{A_u\}$ of users;
    c) a step of creating or updating an index (a df index associated to a user A) df_A on the customer device, associated with a user A, for all the documents i accessible by the user A, with the index df_A being constituted by a table indicating for each term w the number of documents i containing the term w;
    d) requesting steps consisting of:
      encryption, on the customer device, of a request (a query (Q)) Q_x constituted by a succession of terms, by a homomorphic encryption belonging to the same cryptosystem as the encryption applied to TF;
      transmission of the thus encrypted request to the server for carrying out the step of homomorphic calculation and transmission of an encrypted response to the customer and decryption by the customer device;
      an additional step, performed on the customer device, of aggregating the identifiers of the data contained in the encrypted response and in the index df_A recorded on the customer device; and
      the presentation of the result in an orderly form of the documents in accordance with the processing of the previous step.

According to an alternative embodiment, the method includes a step of recreating, on the customer device, the index df_A from the encrypted information $\{\Delta df_i\}$ stored for each document i in the dedicated space of the server assigned to the user A.

According to an alternative embodiment, the calculations performed on the server are implemented in a parallel and/or distributed manner.

According to another alternative embodiment, the server (2) is constituted by a cloud platform.

The present disclosure also relates to a method for preparing a requestable base of documents i containing a sequence of terms, characterized in that it comprises the following steps:
  a) calculation steps on the customer device, when introducing a new requestable document i, for each document i belonging to the corpus, a first table $TF_i$ and a second table $\Delta df_i$,
    the first table $TF_i$ comprising, for each indexed term w of the document i, the number of occurrences of the term w in the document i; and
    the second table $\Delta df_i$ constituted by the presence or not of each term w in the document i;
  b) the encryption of the document i and the table $\Delta dfi$, as well as the encryption, by a method for the homomorphic encryption of the table TFi, and the transmission of these three encrypted digital information to the server for recording in a storage space dedicated to a user A or a group $\{A_u\}$ of users;
  c) a step of creation or updating of an index df_A on the customer device, associated with a user A, for all the documents i accessible by the user A, with the index df_A being constituted by a table indicating, for each term w, the number of documents i containing the term w.

The present disclosure also relates to a method for information retrieval in an encrypted corpus stored on a server, based on a digital request calculated on a customer device, containing a sequence of terms, characterized in that it includes the following steps:
  Encryption of the request on a customer computer device;
  Transmission of the encrypted request to a database management server;

Homomorphic calculation on the server of the encrypted response to the encrypted request recorded on the server;

Transmission of the encrypted response to the customer device; and

Decryption of the encrypted response on the customer device and extraction of the document identifiers.

The requesting steps consisting of:

encryption, on the customer device, of a request Q_x constituted by a succession of terms, by a homomorphic encryption belonging to the same cryptosystem as the encryption applied to TF, transmitting the thus encrypted request to the server for carrying out the step of homomorphic calculation and transmission of an encrypted response to the customer and decryption by the customer device, and includes an additional step performed on the customer device, of aggregating the identifiers of the data contained in the encrypted response and in the index df_A recorded on the customer device, and a step of presenting the result in an ordered form of the documents in accordance with the processing of the preceding step.

BRIEF DESCRIPTION OF THE DRAWINGS

The present disclosure will be best understood when reading the following description that relates to a non-restrictive exemplary embodiment, while referring to the appended drawings, wherein.

DETAILED DESCRIPTION

Hardware Architecture

Figure 1:
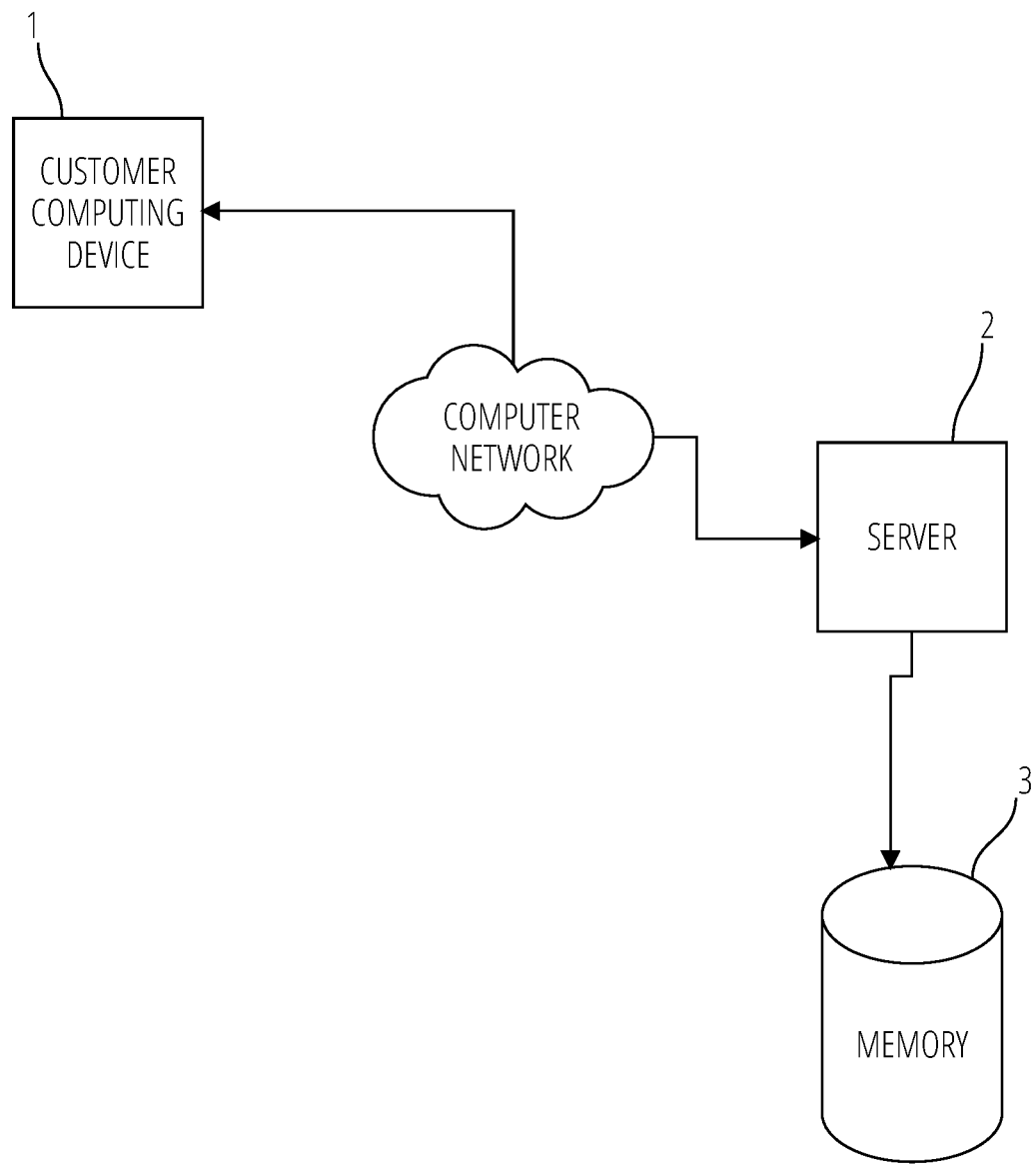
FIG. 1 is a schematic view of a computer system according to the present disclosure.

FIG. 1 shows a schematic view of the hardware architecture of the present disclosure;

It includes a customer computing device (1) connected to a server (2) by a computer network, for example, the Internet.

The server (2) is associated with a memory device (3) for the recording of a database. The server (2) has a processor for performing digital processing.

The server (2) and the memory devices (3) are in a particular example constituted by a set of distributed resources, for example, of the "cloud" type.

Functional Architecture

Figure 2:
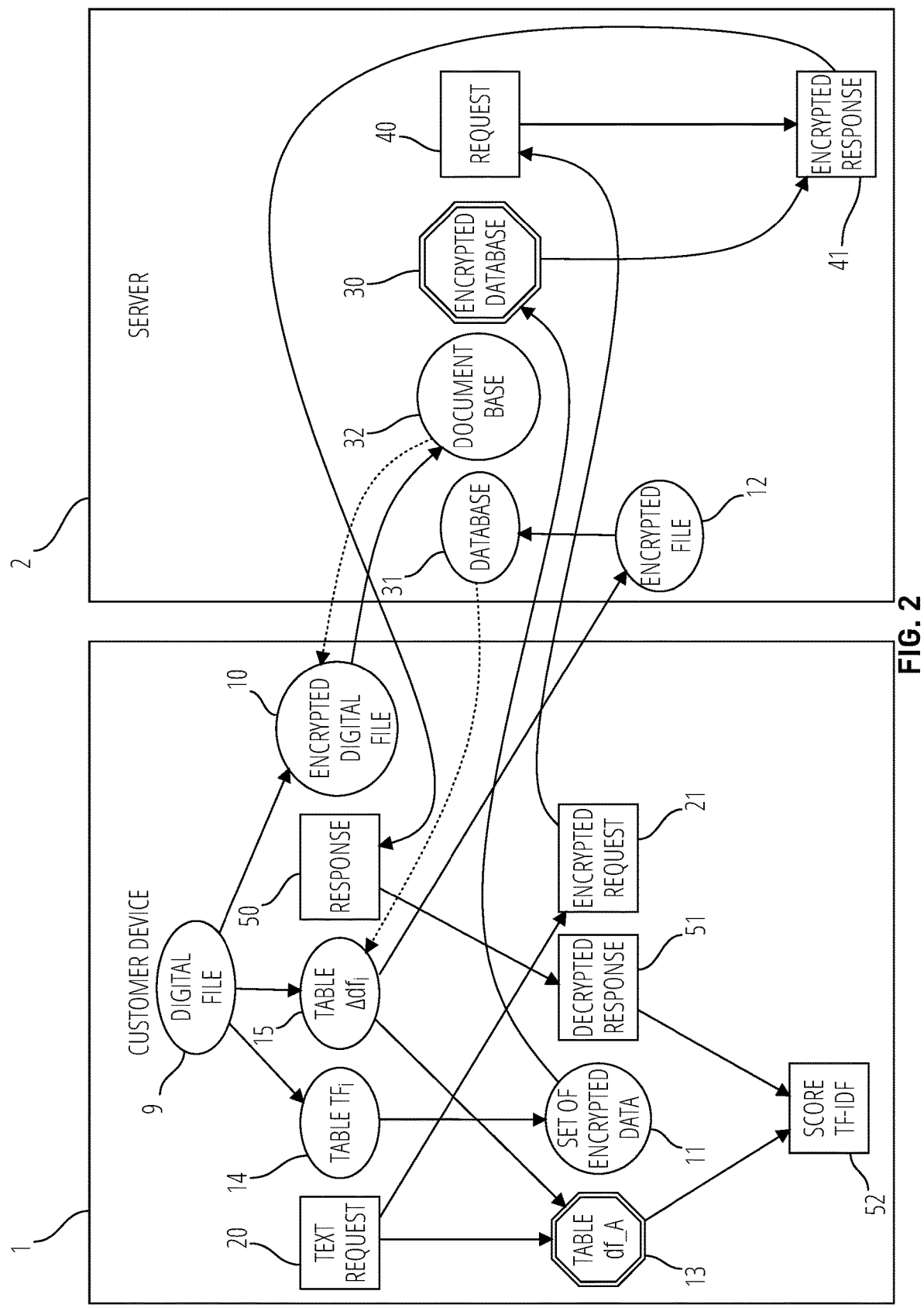
FIG. 2 represents a schematic view of data flows between the various IT resources.

FIG. 2 shows an exemplary functional architecture.

The customer computing device 1 provides initial processing of a document i consisting of a digital file 9 recorded in a working memory.

Optionally, each term of the document is pre-processed by known means such as "stemming," "stop list" (deletion of current words) and any other usual linguistic processing).

Preparation of the Requestable Encrypted Files.

The initial processing is divided into three tasks.

The first task is to apply encryption to the document i with a known cryptographic method, for example, symmetric AES encryption and records an encrypted version (10) of this document on the customer device, and optionally on the server (2) or a third-party storage service. The corpus of thus defined encrypted documents constitutes the document base (32).

A second task, performed in parallel or sequentially, consists in calculating an index of occurrences of the terms present in the digital file 9, and in recording a table $TF_i$ (14) of occurrences, in the form of a list of terms $w_j$ present in the document i, each of the terms $w_j$ in this list being associated with a number corresponding to the occurrence $tf_{ij}$ of the term $w_j$ in the document i.

The table $TF_i$ (14) is therefore of the $\{[w_j; tf_{ij}]\}_j$ type; for a document i.

A third task, performed in parallel or sequentially, consists in calculating a table $\Delta df_i$ 15 corresponding, for each term $w_j$, to the presence or not of the term in the document. This table $\Delta df_i$ (15) is therefore of the $\{[W_j|tf_{ij}>0]\}_j$ type.

The table $TF_i$ (14) is then encrypted using a homomorphic encryption method, for example, according to a method described in article Zhou, H., & Women, G. (février 2014). Efficient homomorphic encryption on integer vectors and its applications. In Information Theory and Applications Workshop (ITA), 2014 (pp. 1-9). IEEE.

The result of this encryption of the table $TF_i$ (14) is a set of encrypted data (11). Each set of encrypted data (11) is transmitted by the customer computing device (1) to the server (2).

The grouping of the encrypted data (11) constitutes an encrypted database (30) of all the $\{TF_i\}_i$.

At the same time or sequentially, the table $\Delta df_i$ (15) is encrypted using a known method, for example, AES and transmitted to the server (2) to record an encrypted file (12) on the server (2).

All the encrypted files (12) recorded on the server form a database (31).

Each encrypted file (12) recorded on the server (2) makes it possible to reconstitute a table df_A 13 by decryption with an algorithm inverse to the one used for the above-mentioned encryption.

This table df_A (13) is calculated only on the customer computing device 1, from:

Either all the encrypted tables of database 31 recorded on the server (2), after the transmission thereof on the customer computing device (1);

or directly by updating a table df_A (13) locally recorded on the customer computing device 1, the update being performed each time a table $\Delta df_i$ (15) is added.

This data preparation step leads to the recording, on the server, of data that are not directly requestable and that do not reveal meaningful information about the content or the documents, especially in the event of an attack on the server or a malicious action by a privileged user.

Requesting

Requesting is performed by sending a text request (20) formed by a combination of words from the customer computing device (1).

Optionally, this text request (20) is pre-processed by known means of "stemming," "stop list" (deletion of current words) and any other usual linguistic processing.

The text request (20) is encrypted using the same homomorphic encryption method as that used for encrypting the table $TF_i$ (14=to obtain an encrypted request (21).

The encrypted request (21) is transmitted to the server (2) that records to make a request (40).

By applying a homomorphic calculation on the data in the encrypted database (30) and the request (40), the server (2) calculates an encrypted response (41). The calculations performed on the server (2) may be implemented in a parallel and/or a distributed manner.

This processing consists in calculating, in the encrypted domain, the number of occurrences of each term $q_k$ of the request (40) for each known document i.

For each of the k terms $q_k$ and for each document i, the values $tf_{i,j}$ are counted for the cases where $q_k$ corresponds to a term $w_j$, from the encrypted database (30) of tables $\{[w_j; tf_{ij}]\}_i$ and in the encrypted space, without decrypting the variables $w_j$, $q_k$ and $tf_{i,j}$.

All these counts constitute an encrypted response (41) that is transmitted to the customer computing device (1) and records it locally as an encrypted response (50).

The customer is then able to decrypt the encrypted response (50) to calculate a decrypted response (51).

Finally, the customer can combine the encrypted response 51 and the table df_A (13) to calculate a score TF-IDF (52) according to a known method.

This score TF-IDF (52) constitutes a classification key for the documents i in the order of relevance to the text request (20).

Optionally, the customer computing device 1 presents the results as a search engine and allows the user to find the corresponding record.

The invention claimed is:

1. A method for information retrieval in an encrypted corpus stored on a server, from a text request calculated on a customer computer device, including a succession of terms, the method comprising:

encrypting the text request on the customer computer device;

transmitting the encrypted text request to the server;

performing homomorphic calculation on the server of an encrypted response to the encrypted text request recorded on the server;

transmitting the encrypted response to the customer computer device; and decrypting the encrypted response on the customer computer device and extracting document identifiers, wherein decrypting the encrypted response comprises:

a) calculating, on the customer computer device, when introducing a new requestable document, for each document belonging to the encrypted corpus, a first table and a second table different from the first table;

the first table comprising, for each indexed term of the new requestable document, a number of occurrences of the indexed term in the new requestable document, and the second table indicating indices of each indexed term that is present in the new requestable document;

b) encrypting the new requestable document and the second table, as well as encrypting, by a homomorphic encryption method, the first table, and transmitting the encrypted new requestable document, the encrypted second table, and the encrypted first table to the server for recording in a storage space, dedicated to a user or to a group of users;

c) creating or updating an index on the customer computer device, the index associated with the user, for all documents accessible by the user, with the index being constituted by a table indicating for each indexed term a number of documents containing the indexed term;

d) requesting, comprising:

encrypting, on the customer computer device, the text request constituted by the succession of terms, by a homomorphic encryption belonging to the same cryptosystem as the encryption applied to the first table;

transmitting the text request thus encrypted to the server for carrying out the homomorphic encryption and transmitting the encrypted response to the customer computer device and decrypting the encrypted response by the customer computer device;

aggregating, by the customer computer device, the document identifiers of data contained in the encrypted response and in the index recorded on the customer computer device; and presenting a result in an orderly form of the documents on the customer computer device.

2. The method of claim 1, further comprising recreating, on the customer computer device, the index from encrypted information stored in the storage space of the server assigned to the user.

3. The method of claim 1, wherein operations performed on the server are implemented in parallel.

4. The method of claim 3, wherein the server is part of a cloud platform.

5. A method for information retrieval in an encrypted corpus stored on a server, from a text request calculated on a customer computing device, the method comprising:

encrypting the text request including a succession of terms on the customer computing device, the encrypting performed using a homomorphic encryption belonging to a same cryptosystem as an encryption applied to a term frequency table;

transmitting the encrypted text request to the server;

performing homomorphic calculation, on the server, of an encrypted response to the encrypted text request;

transmitting the encrypted response to the customer computing device;

decrypting, on the customer computing device, the encrypted response and extracting document identifiers;

aggregating, on the customer computing device when introducing a new requestable document, the document identifiers of data contained in the encrypted response and in an index recorded on the customer computing device, the index associated with a user, for all documents accessible by the user, with the index being constituted by a table indicating for each indexed term a number of documents containing the indexed term, the aggregating including creating a first table and a second table different from the first table, the first table comprising, for each indexed term of the new requestable document, a number of occurrences of the indexed term in the new requestable document, the second table indicating indices of each indexed term that is present in the new requestable document;

encrypting the new requestable document and the second table, as well as encrypting, by a homomorphic encryption method, the first table, and transmitting the encrypted document, the encrypted second table, and the encrypted first table to the server for recording in a storage space, dedicated to a user or to a group of users; and presenting a result in an ordered form of documents on the customer computing device.

* * * * *

UNITED STATES PATENT AND TRADEMARK OFFICE
CERTIFICATE OF CORRECTION

| | |
|---|---|
| PATENT NO. | : 11,308,233 B2 |
| APPLICATION NO. | : 16/483684 |
| DATED | : April 19, 2022 |
| INVENTOR(S) | : Henri Binsztok |

It is certified that error appears in the above-identified patent and that said Letters Patent is hereby corrected as shown below:

In the Specification

| | | |
|---|---|---|
| Column 2, | Line 61, | change "E2865127" to --EP2865127-- |
| Column 3, | Line 54, | change "table La" to --table (a-- |
| Column 3, | Line 56, | change "$\Delta df_i$" to --$\Delta df_i$,-- |
| Column 3, | Line 58, | change "word w)" to --word (w))-- |
| Column 4, | Line 42, | change "$\Delta df_i$," to --$\Delta df_i$;-- |
| Column 6, | Line 17, | change "Women," to --Wornell,-- |
| Column 7, | Line 14, | change "encrypted" to --decrypted-- |

Signed and Sealed this
Seventeenth Day of October, 2023

Katherine Kelly Vidal
*Director of the United States Patent and Trademark Office*